B. REGAN.

Seed-Drill.

No. 6,672. Reissued Oct. 5, 1875.

Attest

C. M. Connell

Alfred Cloughly

Inventor:

Barnard Regan

Benjamin Rubins assignee

N. PETERS, PHOTO-LITHOGRAPHER, WASHINGTON, D. C.

UNITED STATES PATENT OFFICE.

BENJAMIN KUHNS, OF DAYTON, OHIO, ASSIGNEE OF JOSEPHINE REGAN, JOHN REGAN, HARLEY REGAN, CARRIE REGAN, AND EUGENIA BELLE REGAN, HEIRS OF BARNERD REGAN, DECEASED.

IMPROVEMENT IN SEED-DRILLS.

Specification forming part of Letters Patent No. 37,978, dated March 24, 1863; reissue No. 6,672, dated October 5, 1875; application filed June 1, 1875.

*To all whom it may concern:*

Be it known that BARNERD REGAN, late of Miamisburg, in the county of Montgomery and State of Ohio, did invent a new and useful Improvement in Seed-Drills; and I hereby declare that the following is a full, clear, and exact description of the same, reference being had to the accompanying drawing, and to the letters of reference marked thereon, which form a part of this specification.

This invention has reference to the mode of construction and combination of feed apparatus for grain-drills, and also to the aperture through which the seed is delivered.

In order that others duly skilled may be enabled to understand and construct the same, it will now be described in detail.

Figure 1:
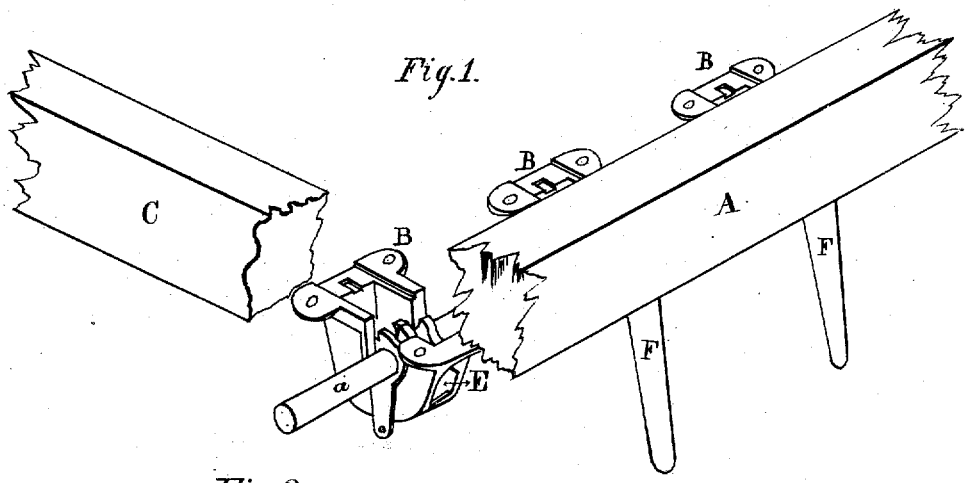
Figure 2:
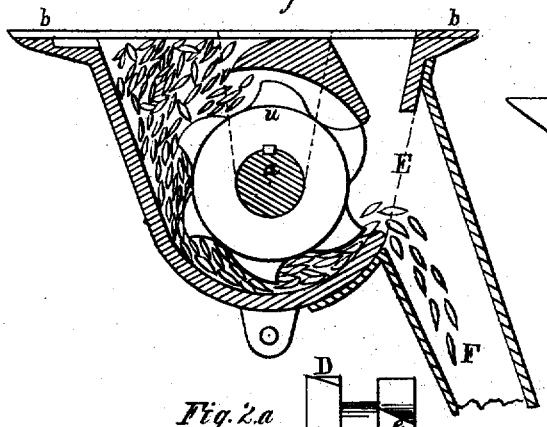
Figure 3:
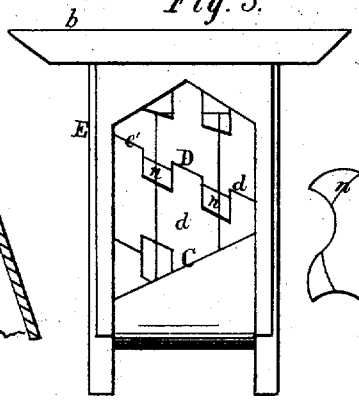
Figure 3A:
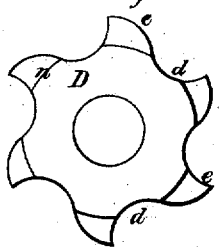
Figure 2A:
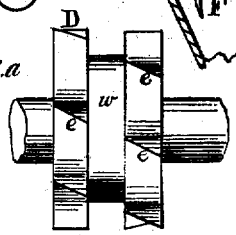

In the accompanying drawing, Figure 1 is a perspective representation of the rear portion of a grain-drill, showing the position of the feed and delivering apparatus, and the seed-box or hopper above, a portion of the beams being removed. Fig. 2 is a vertical transverse section, showing the feed and delivery apparatus. Fig. $2^a$ is a vertical projection at right angles to the plane of section above described of the feed-wheel therein shown. Fig. 3 is vertical projection on a plane parallel to the plane of section in Fig. 2 of the delivery apparatus, showing the form of delivering-aperture and beyond and within the cup or feed-wheel of a form slightly different from that shown in Fig. 2 and Fig. $2^a$. Fig. $3^a$ is a vertical projection at right angles to the plane of projection in Fig. 3 of one of the feed-wheels.

Like letters of reference designate like parts in all of the drawings.

A is the rear beam of the machine, on which the seed-box or hopper (not shown in drawing) is fixed, and in front of which the shaft *a* passes. To the under side of this beam and to that of hopper the seed-cups B B B are secured by screws passing through flanges or lugs *b b*, &c. C is the outer side beam of machine, a portion of which is removed to show more clearly the feed and delivery apparatus below. The shaft *a* passes through the sides of seed-cups B B B, and through the feed-wheels D D D, which are keyed thereon. This shaft is connected by means of pinions of pulleys with the traction-wheels of the implement in any of the well-known methods, which, as they form no part of the present invention, are not delineated in the drawing, nor herein described. As the implement moves onward the shaft *a* revolves. The feed-wheels D D D, being keyed thereon, revolve also, and in revolving feed the seed which, by its own weight, falls from the hopper into the cups B, and is carried by the wheels to and delivered through the opening E into delivery-tubes F.

Thus far the description has been general, and would apply to some existing seed-drills equally with this. As before stated, however, the present improvements have reference to the peculiar construction of the feed-wheel D, and its combination with other parts of the device and to the aperture E, and hence these will now be described in detail.

The delivery-opening E in cup B has only one peculiarity, viz: The lower line or sill *c* is angular upon its upper surface, its angularity being opposite in direction to the obliquity of the helical grooves and ridges in feed-wheel.

The feed-wheels of some existing seed-drills are grooved or furrowed in a direction parallel to their axes, the sharp ridges formed by the intersection of the curves of contiguous grooves thus presenting a chisel-edge to the seed in which the wheel revolves, and the tendency in such chisel-edge is to cut or break a portion of the seed with which it comes in contact, thus causing a waste and risking the sufficiency of the crop; moreover, by means of such horizontal ridges and furrows, the seed is delivered in successive portions to the delivery-tubes instead of in a continuous stream. Both of these imperfections are obviated by making the grooves *d d d* in a direction oblique to the axis *a* and forming part of a helix, the ridges *e e e* following also the same oblique or helical line. By this arrangement alone, in connection with the angular line *c* of aperture E, it will be seen that a continuous instead of an intermittent discharge of seed is secured, for, as will be seen on inspecting the drawing, Fig. 3, before the lower edge of ridge $e'$ has delivered the seed brought up by it over the highest part of the angular surface $c$ of the delivery-aperture, the upper edge of following cavity $d$ has begun to deliver its contents over the lowest point of same angular surface. Moreover, the oblique edges of ridges $e$ not striking the seed squarely, as in those above described, are not so apt to cut or break the seed, for the latter, being subject to force applied in an oblique direction, slip from under the edges and pass into the forward stream.

When the feed-wheel is constructed (as is the case in some existing drills) of one piece great care and accuracy is required to make it fit accurately the cup in which it revolves, for if it should not fit exactly, being too small, there is danger of the seed falling or being drawn between the side of the wheel and inside of the cup, to the destruction of the seed, and the ultimate derangement of the operation of feed apparatus. If the wheel should be made too tight, obstruction to easy working would be caused. Moreover, the construction in one piece is, especially in oblique wheels, difficult and troublesome.

To obviate these objections it is proposed to construct the feed-wheel D in two or more transverse sections, as shown in Figs. $2^a$ and 3. Constructed thus any little inaccuracy in their size, relative to inside of cup B, may be remedied by means of thin washers placed between the several parts. The construction of the wheel is, moreover, thus facilitated. Finally, there is introduced in the feed-wheel D a device for the purpose of causing the seed sown by this improved drill to be arranged always in one direction, viz, with their longer axes in the line of motion of the implement, and consequently in the line of the furrow or drill. This is a matter of more consequence in drilling oats than in drilling wheat, inasmuch as the ratio between the long and short axis is greater in the former than in the latter.

There are two methods of effecting the above object: either by introducing between each of the two or more sections of feed-wheel a washer, $w$, as shown in Figs. 2 and $2^a$, or by forming notches $n$ $n$ of a breadth equivalent to such washers in the helical ridges $e$ $e$ $e$, as shown in Figs. 3 and $3^a$. Either method will effect the same object, viz, the conducting of the grain into the line of revolution of feed-wheel.

By means of either variation of this device the danger previously mentioned of cutting the grain by the edges of ridges $e$ $e$ is avoided, for, as will be seen on inspecting the drawings, there is thus not a continuous ridge, but a series of points coming down on and among the grain in the cup B.

It should here be remarked that the breadth of washers $w$, or of notches $n$, should not be too great, else the object for which they are introduced will be lost, and the grain will slip through in any direction, and independently of the rotation of feed-wheel.

To recapitulate: These improvements comprehend, first, the forming of grooves $d$ $d$ and ridges $e$ $e$ in an oblique direction across the periphery of feed-wheels for grain-drills, instead of, as in others, in a horizontal direction, and, in connection with this, forming the upper surface $c$ of delivery-opening E at an angle in an opposite direction to the obliquity of grooves $d$ and ridges $e$, and in combining a wheel thus formed with a seed-cup; second, forming or constructing the feed-wheel D in two or more sections; third, separating the two or more sections of feed-wheel D by a washer, $w$, or washers, or, what is equivalent to this, forming notches $n$ in the ridges $e$ $e$, as hereinbefore explained.

By means of these improvements the following, among other advantages, are secured: First, a continuous, instead of an intermittent, discharge of seed, and avoidance of cutting or breaking the seed by edges of ridges $e$ $e$; second, greater facility of construction and accuracy of adjustment, and operation of feed-wheel D in the cup B with less labor and fitting; third, the grain is laid in one direction previous to delivery into the furrow, and thus more even drilling and a neater and better crop is secured.

Having thus described the invention, what is claimed, and desired to be secured by Letters Patent, is—

1. A distributing device for a force-feed grain-drill, consisting, substantially, of a seed-cup or secondary hopper, having an elevated delivery-orifice, and a seed-wheel, having on its periphery a series of helical cavities, separated by a series of spiral ribs or projections for evenly distributing the grain, the parts being arranged substantially as shown and described.

2. The feed-wheel D, constructed in sections $e$ $e$ $w$, or with notches $n$ $n$ in the spiral projections, substantially as and for the purpose set forth.

BENJAMIN KUHNS.

Witnesses:
A. CLOUGHLY,
C. M. CONNELL.